US006407997B1

(12) United States Patent
DeNap et al.

(10) Patent No.: US 6,407,997 B1
(45) Date of Patent: Jun. 18, 2002

(54) ASYNCHRONOUS TRANSFER MODE SYSTEM FOR PROVIDING TELEPHONY SERVICE

(75) Inventors: Frank Anthony DeNap, Millbrae, CA (US); Harold Wayne Johnson, Lenexa, KS (US); Bryan Lee Gorman, Mission, KS (US); William Lee Edwards, Overland Park, KS (US); Michael Thomas Swink, Lenexa, KS (US); Timothy Gene Kelley, Shawnee, KS (US); James William Baumgart, Valley Center, CA (US); Martin Joseph Kaplan, Olathe, KS (US); Abdullah Murat Bog, Milpitas, CA (US); John Arndt Strand, III, Leavenworth, KS (US)

(73) Assignee: Sprint Communications Company L.P., Overland Park, KS (US)

( * ) Notice: Subject to any disclaimer, the term of this patent is extended or adjusted under 35 U.S.C. 154(b) by 0 days.

(21) Appl. No.: 09/129,248

(22) Filed: Aug. 5, 1998

(51) Int. Cl.[7] .......................... H04L 12/66; H04L 12/56
(52) U.S. Cl. .................... 370/352; 370/395.1; 370/401; 370/466; 370/494
(58) Field of Search .................................. 370/352, 401, 370/465, 466, 480, 485, 490, 493, 494, 495, 395.1, 395.64

(56) References Cited

U.S. PATENT DOCUMENTS

| | | | |
|---|---|---|---|
| 5,991,301 A | * | 11/1999 | Christie |
| 6,049,531 A | * | 4/2000 | Roy |
| 6,108,350 A | * | 8/2000 | Araujo et al. |
| 6,141,339 A | * | 10/2000 | Kaplan et al. |
| 6,229,803 B1 | * | 5/2001 | Bog et al. |

* cited by examiner

Primary Examiner—Melvin Marcelo
Assistant Examiner—Soon-Dong Hyun
(74) Attorney, Agent, or Firm—Harley R. Ball; Steven J. Funk; Kevin D. Robb

(57) ABSTRACT

The invention is an ATM communications system that provides the option of advanced communications services or conventional telephone service to the customer. Advantageously, the ATM communications system does not require the widespread deployment of class 5 telephone switches to provide telephone service. A residential communications hub is located at a residence and communicates with the telephones at the residence using the analog telephony format. The residential communications hub converts between the analog telephony format and the ATM format. The residential communications hub is connected to a DSL mux by telephone wiring that carries the ATM/DSL format. The residential communications hub and the DSL mux communicate using the ATM/DSL format. The DSL mux converts between the ATM/DSL format and the ATM/SONET format. The DSL mux is connected to the an ATM switch by a broadband connection that carries the ATM/SONET format. The DSL mux and the ATM switch communicate using the ATM/SONET format. The ATM switch establishes ATM communications paths for the telephone service. A telephony hub is connected to telephones by telephone wiring that carries the analog telephony format. The telephony hub communicates with the telephones using the analog telephony format. The telephony hub is connected to the ATM switch by a broadband connection that carries the ATM/SONET format. The telephony hub and the ATM switch communicate using the ATM/SONET format.

10 Claims, 10 Drawing Sheets

ASYNCHRONOUS TRANSFER MODE SYSTEM FOR PROVIDING TELEPHONY SERVICE

RELATED APPLICATIONS

Not applicable.

FEDERALLY SPONSORED RESEARCH OR DEVELOPMENT

Not applicable.

MICROFICHE APPENDIX

Not applicable.

BACKGROUND OF THE INVENTION

1. Field of the Invention

The invention relates to communications systems, and in particular, to communications systems that provide an interface between analog telephony systems and Asynchronous Transfer Mode (ATM) systems.

2. Background

The telephone wires to the residence are known as the local loop. The local loop has primarily been used to carry analog telephony traffic. The primary device for providing analog telephony at the local level is the class 5 telephone switch. Class 5 telephone switches are well known. Class 5 telephone switches are complex and expensive to deploy and operate. They are also relatively difficult to re-program and re-configure in order to implement new services. One example is the current problem class 5 telephone switches are having handling large amounts of Internet traffic.

The class 5 telephone switch communicates with an analog telephone using the analog telephony signals in the well-known analog telephony format. The class 5 telephone switch provides power to the telephone. The class 5 telephone switch detects off-hook current caused by the telephone and provides the telephone with dial tone. The caller generates Dual-Tone Multi-Frequency (DTMF) signals. The class 5 telephone switch detects the DTMF signals and initiates the call in the network. When the far-end telephone is ringing, the class 5 telephone switch plays a ringback tone to the caller. If the far-end telephone is busy, the class 5 telephone switch plays a busy tone to the caller. On incoming calls, the class 5 telephone switch provides ring current to the telephone.

Digital Loop Carrier (DLC) devices have been deployed to provide a digital interface between an analog telephone and a class 5 telephone switch. DLC devices are well-known. DLC devices use the analog telephony format to communicate with the telephone, but they use a digital format to communicate with the class 5 telephone switch. The digital format is specified by Bellcore Technical Reference 303 (TR-303).

Digital Subscriber Line (DSL) technology has been developed to provide greater bandwidth to the local loop. DSL technology superimposes high bandwidth data over the analog telephony traffic on the local loop. This high bandwidth data is transparent to the analog telephony operation of the local loop. At the central office, the high bandwidth data is removed from the twisted pair and provided to a separate data network. The analog telephony traffic remains on the twisted pair and is provided to a class 5 telephone switch. DSL devices do not operate on local loops using DLC devices.

DSL technology allows high bandwidth data and analog telephony traffic to co-exist on the local loop. The analog telephony traffic is still handled by a class 5 telephone switch in the conventional manner, but the high bandwidth data is removed from the line before the class 5 telephone switch. A typical application is to use DSL technology to provide a high speed Internet connection while using the class 5 telephone switch to handle the analog telephony traffic. This provides an advantage to established local networks because it removes the Internet traffic loads from the class 5 telephone switches, and it allows the local networks to continue to leverage their existing class 5 telephone switches for the analog telephony traffic.

Asynchronous Transfer Mode (ATM) and Synchronous Optical Network (SONET) technologies have also been developed to provide broadband transport and switching capability to Local Area Networks (LANs), Wide Area Networks (WANs), and other networks. Prior systems do not contemplate converting the analog telephony traffic to ATM before it is placed on the DSL local loop. This is because standard class 5 telephone switches on the network side of the local loop do not typically handle ATM traffic. As a result, ATM technology has not been combined with DSL technology to carry residential telephone traffic. The analog telephony traffic carried by a DSL local loop still requires processing by a complex and expensive class 5 telephone switch.

Despite the availability the above-mentioned technologies, a large customer base remains that chooses not to migrate from their existing analog telephone service using conventional telephones. Telephony hubs are being developed to service these customers. The telephony hub provides traditional analog telephone service over local loops to the customers choosing such service. The telephony hub is capable of providing this traffic to an advanced communications network in the ATM format. The telephony hub also provides digital telephone service for telephones that are connected to a DLC device.

This situation is tolerable for established networks with a large pre-existing class 5 telephone switch network, but the situation is problematic for new entrants into the local market. The new entrants do not have an existing network of class 5 telephone switches. With imminent opportunities to compete for local telephone services, there is a need for an alternative to the class 5 telephone switch that can be used to offer telephone services in the local environment. This alternative should provide advanced communications technology, but should also provide traditional telephony services to customers who desire conventional telephone services.

SUMMARY

The invention overcomes the above problems by providing an ATM communications system that provides the option of advanced communications services or conventional telephone service to the customer. Advantageously, the communications system does not require the widespread deployment of class 5 telephone switches to provide telephone service.

The invention is an ATM communications system for providing telephony service. A residential communications hub is located at a residence and communicates with the telephones at the residence using the analog telephony format. The residential communications hub converts between the analog telephony format and the ATM format. The residential communications hub is connected to a DSL mux by telephone wiring that carries the ATM/DSL format. The residential communications hub and the DSL mux communicate using the ATM/DSL format. The DSL mux converts between the ATM/DSL format and the ATM/ SONET format. The DSL mux is connected to the an ATM switch by a broadband connection that carries the ATM/ SONET format. The DSL mux and the ATM switch communicate using the ATM/SONET format. The ATM switch establishes ATM communications paths for the telephone service. A telephony hub is connected to telephones by telephone wiring that carries the analog telephony format. The telephony hub communicates with the telephones using the analog telephony format. The telephony hub is connected to the ATM switch by a broadband connection that carries the ATM/SONET format. The telephony hub and the ATM switch communicate using the ATM/SONET format.

DETAILED DESCRIPTION

Figure 1:
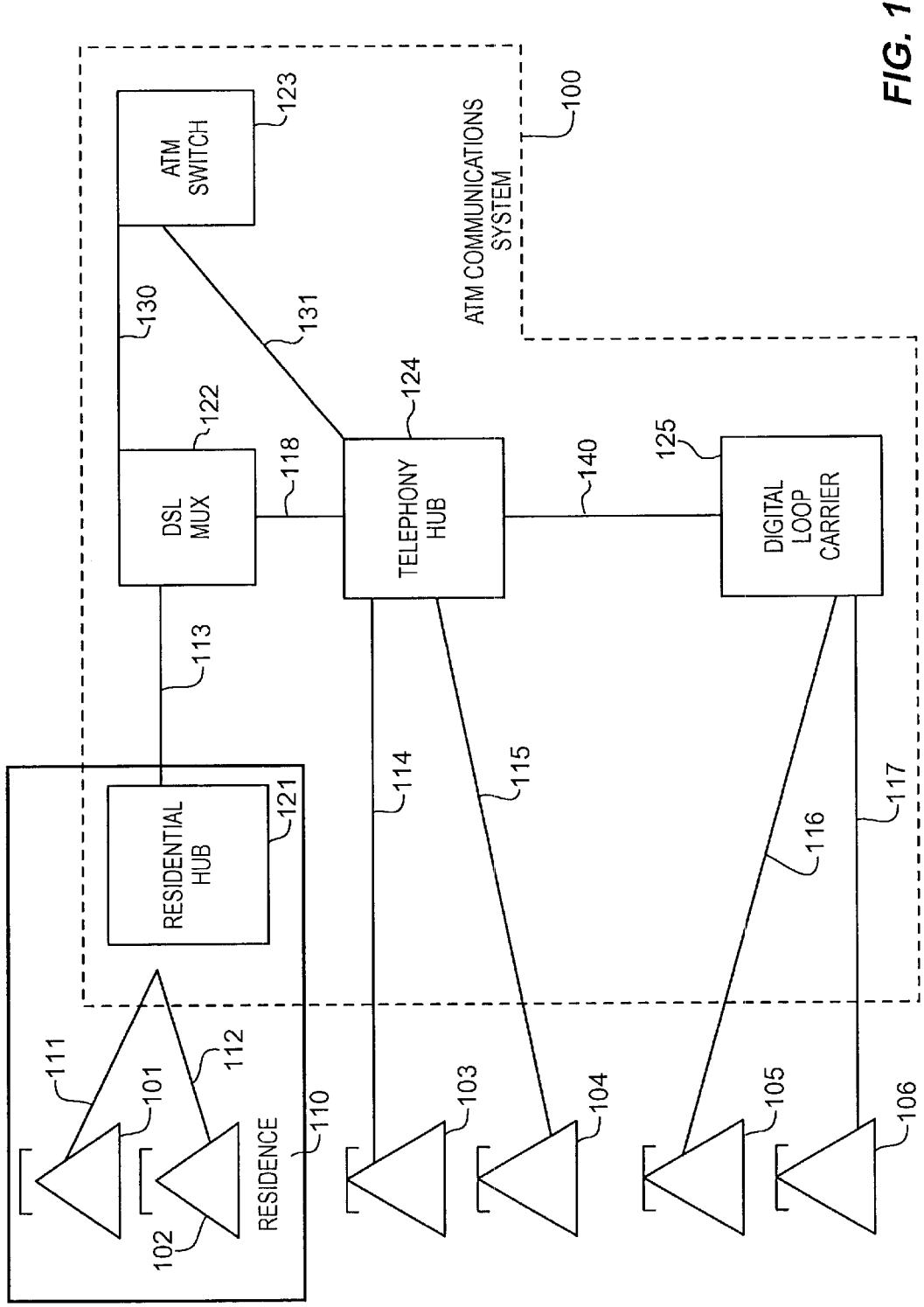
FIG. 1 is an architecture in an embodiment of the invention.

System Architecture FIG. 1

The invention is an ATM communications system 100 for providing options of advanced services and conventional telephony services to the customer. Advantageously, the communications system does not require the widespread deployment of class 5 telephone switches. The ATM communications system 100 is comprised of a residential hub 121, a DSL mux 122, an ATM switch 123, a telephony hub 124, a DLC 125, and associated connections. The ATM communications system 100 is connected to telephones 101–106. The residential hub 121 and the telephones 101 and 102 are in a residence 110.

The telephones 101 and 102 are connected to the residential hub 121 by connections 111 and 112 respectively. The residential hub 121 is connected to the DSL mux 122 by connection 113. The DSL mux 122 is connected to the ATM switch 123 by connection 130. The telephones 103 and 104 are connected to the telephony hub 124 by connections 114 and 115 respectively. The telephony hub 124 is connected to the ATM switch 123 by connection 131. The DSL mux 122 is connected to the telephony hub 124 by connection 118. The telephones 105 and 106 are connected to the DLC 125 by connections 116 and 117 respectively. The DLC 125 is connected to the telephony hub 124 by connection 140.

The telephones 101–106 are conventional communications devices that use the analog telephony format. The connections 111–118 are my medium operational to carry analog telephony signals, and the connections 111–118 are typically twisted pairs of copper wires. The connection 113 is also capable of carrying signals using the ATM/DSL format. The ATM/DSL format is a DSL signal that transports ATM cells as the high-bandwidth data.

The residence 110 is a conventional dwelling where people reside, such as a house, duplex, apartment, or condominium. The residential hub 121 is a device that is located in the residence 110. The residential hub 121 provides the analog telephony interface to the telephones 101 and 102. The residential hub 121 provides an ATM/DSL interface to the ATM communications system 100. The residential hub 121 executes provider agent software that directs system operation.

The DSL mux 122 is a device that interworks the ATM/ ADSL format with an ATM/broadband format. The ATM/ broadband format is a broadband signal that transports ATM cells. Synchronous Optical Network (SONET) is a popular broadband format, and the ATM/SONET format is well known. Preferably, the DSL mux 122 includes redundant OC-3 network interfaces and handles up to 255 residences on the access side. The DSL mux 122 should be able to differentiate data from voice. In some embodiments, the DSL mux 122 could be adapted to provide Switched Virtual Circuits (SVCs) to the ATM switches 123. The DSL mux 122 could be adapted from the DSL product provided by Westell.

The ATM switch 123 is able to establish SVCs and Permanent Virtual Circuits (PVCs). The ATM switch 123 is conventional such as the Vector switch supplied by Nortel. The connections 130 and 131 carry the ATM/broadband format. In some embodiments the connections 130 and 131 carry the ATM/SONET format. For example, the connections 130 and 131 could be comprised at least in part of a Broadband Metropolitan Area Network (BMAN) that uses a 4-fiber, bi-directional, line switched, self-healing, OC-3 SONET ring.

The telephony hub 124 provides an analog telephony interface to the telephones 103 and 10 104. The telephony hub 124 provides a digital telephony interface to the telephones 105 and 106 through the DLC 125. The telephony hub 124 provides an ATM interface to the ATM switch 123. The telephony hub 124 executes provider agent software that directs system operation. The telephony hub 124 could be adapted from the LDR-200 supplied by Yurie Systems.

The DLC 125 provides an analog telephony interface to the telephones 105 and 106. The DLC provides a digital interface to the telephony hub 124. The DLC 125 is a conventional device that operates in accord with Bellcore TR-303. The connection 140 is a Time Division Multiplex (TDM) connection, such as a DS1 or a DS3.

There are various ATM connectivity options between the ATM switch 123 and the residential hub 121 or the telephony hub 124. ATM connections could be provisioned as PVCs from the hubs 121 and 124 directly to the ATM switch 123. PVCs tend to waste bandwidth in the SONET rings comprising the connections 130 and 131. ATM connections could be provisioned from the residential hub 121 to the DSL mux 122, and the DSL mux 122 and the ATM switch 123 could establish SVCs to communicate. The entire connection between the hubs 121 and 124 could establish SVCs as needed. Combinations of PVCs and SVCs could also be used. For example, low bandwidth control channels could be provisioned directly from the hubs 121 and 124 to the ATM switch 123, but higher bandwidth user channels could be established on an SVC basis.

The exact configuration and connections depicted on FIG. 1 are exemplary and all possible configurations and connections cannot be depicted in the interests of clarity and conciseness. Those skilled in the art will recognize variations and substitutes which do not depart from the scope from the invention. An ATM communications system is disclosed in U.S. patent application No. 08/826,641, entitled "Telecommunications System", filed on Apr. 7, 1997, assigned to the same entity as this Patent Application, and that is hereby incorporated by reference into this Patent Application. Provider Agents are discussed in detail below and in two United States Patent Applications, both entitled "Telecommunications Provider Agent", dockets 1190 and 1191, both filed on the same date as this Patent Application, both assigned to the same entity as this Patent Application, and that are both incorporated by reference into this Patent Application.

Figure 2:
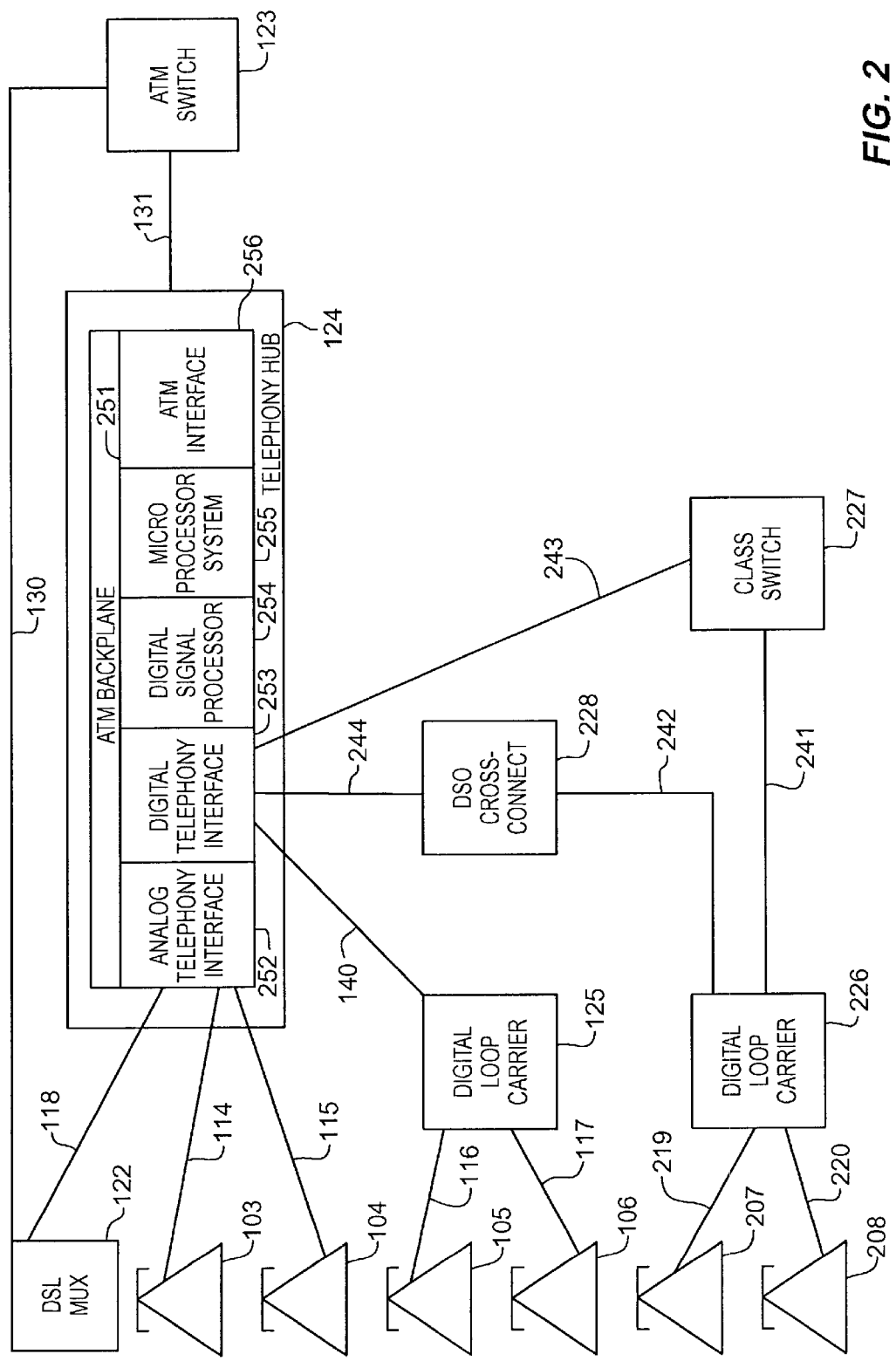
FIG. 2 is a block diagram of a telephony hub in an embodiment of the invention.

The Telephony Hub—FIG. 2

FIG. 2 depicts a version of telephony hub 124, but other versions that support the invention are possible. The telephony hub 124 is shown connected to only a few telephones for reasons of clarity, but the telephony hub 124 is typically connected to approximately 200 phones on 200 channels. The telephones 103–106, DSL mux 122, ATM switch 123, telephony hub 124, DLC 125, and connections 114–118, 130, 131, and for FIG. 1.

The telephones 207 and 208 are connected to the DLC 226 by connections 219 and 220 respectively. The DLC 226 is connected to the class 5 telephone switch 227 by connection 241 and is connected to the DS0 cross-connect 228 by connection 242. The class 5 telephone switch 227 is connected to the telephony hub 124 by connection 243. The DS0 cross-connect 228 is connected to the telephony hub 124 by connection 244. Telephones 207 and 208 are similar to the telephones 103–106. The connections 219 and 220 are similar to the connections 114–118. The DLC 226 is similar to the DLC 125. The class 5 telephone switch 227 and the DS0 cross-connect are both conventional devices that are well-known in the art. The connections 241–244 are conventional TDM connections. The class 5 telephone switch 227 could be in another network, and the analog hub 124 could route local calls to the other network through the class 5 telephone switch 227.

The telephony hub 124 includes an ATM backplane 251 that interconnects an analog telephony interface 252, a digital telephony interface 253, a Digital Signal Processor (DSP) 254, a microprocessor system 255, and the ATM interface 256. Under control of a provider agent, the analog telephony interface 252 uses the analog telephony format to communicate with the telephones 103 and 104. Under control of the provider agent, the digital telephony interface uses the digital telephony format to communicate with the DLC 125, the DS0 cross-connect 228, and the class 5 telephone switch 227.

The DSP 254 provides echo cancellation, facsimile emulation, and modem emulation. Modem and facsimile calls can be routed to the DSP 254. The DSP 254 interworks the modem or fax communication from the connections 114, 115, 118, 140, 244, and 243 with a Variable Bit Rate (VBR) ATM format, such as ATM Adaption Layer 5 (AAL5). AAL 5 saves bandwidth over the Constant Bit Rate AAL 1 used for voice calls.

The microprocessor system 255 executes the provider agent. The provider agent directs the analog telephony interface 252 and the digital telephony interface 253 to communicate with the telephones 103–106 and 207–208 using the conventional analog and digital telephony formats. The provider agent directs the analog telephony interface 252 and the digital telephony interface 253 to interwork the analog and digital telephony signals with ATM signals for the ATM interface 256. The provider agent directs the analog telephony interface 252 and the digital telephony interface 253 to route selected call through the DSP 254.

In some embodiments, the analog telephony interface 252 can provide analog telephony service to the DSL mux 122 over connection 118. Referring to FIG. 1, the telephones 111 and 112 are automatically connected to the telephony hub 124 if the residential hub 121 is unable to provide telephone service. If the residential hub 121 fails, it is configured to automatically connection connections 111 and 112 to connection 113. If the residential hub 121 fails, the DSL mux 122 is configured to automatically connect the connection 113 to the connection 118 using its POTS splitter. The telephony hub 124 is then directly wired to the telephones 111 and 112 and communicates with them using the analog telephony interface. This capability is especially critical for emergency 911 telephone service if the power at the residence 110 fails for a period of time.

Figure 3:
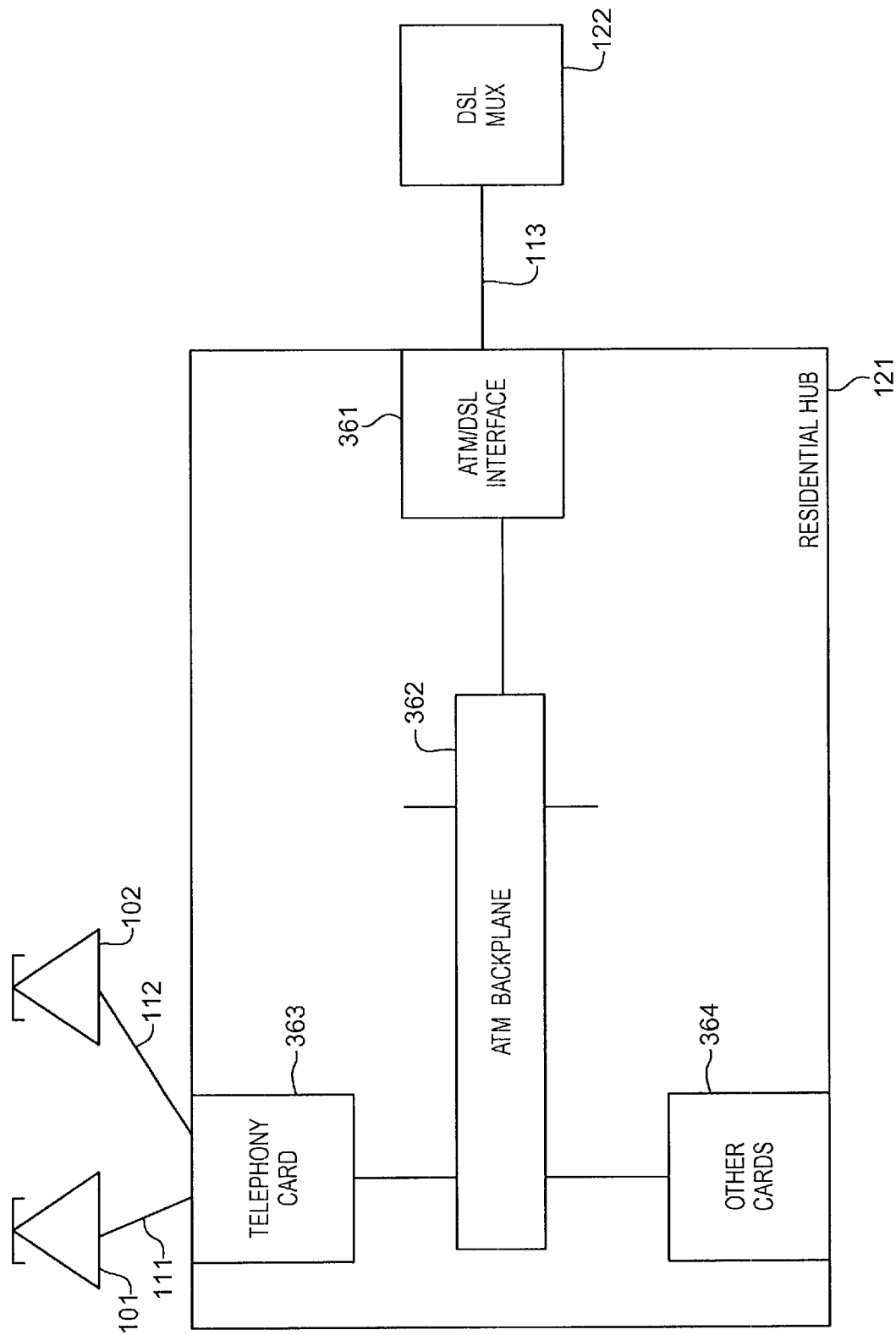
FIG. 3 is a block diagram of a residential hub in an embodiment of the invention.

The Residential Hub—FIG. 3

FIG. 3 depicts an example of the residential hub 121 in some embodiments of the invention, but variations in the residential hub 121 are contemplated by the invention. Conventional requirements for the residential hub 121 can be found in Telecommunications Industry Association (TIA) document SP-3771. The residential hub 121 includes an ATM/DSL interface 361, an ATM backplane 362, a telephony card 363, and other cards 364. The telephones 101 and 102 are connected to the telephony card 363 by connections 111 and 112. The ATM/DSL interface is connected to the DSL mux 122 by connection 113. An uninterruptable power supply (UPS) may be included if desired in order to provide power during an outage to the residence 110.

The ATM/DSL interface 361 provides smoothing and shaping for the ATM signals. The ADSL/ATM interface 361 converts control and communications ATM cells into the ATM/DSL format for transport to the DSL mux 122. The ATM/DSL interface 361 also receives control and communications ATM cells from the DSL mux 122 and provides these to the appropriate components of residential hub 121 using the ATM backplane 362. The ATM backplane 362 allows for ATM communications within the residential hub 121.

The telephony card 363 supports analog telephony communications with the telephones 101 and 102. The telephony card 363 is controlled by a provider agent that is resident in the residential hub 121. The telephony card 363 provides power and dial tone to the telephones. The telephony card 363 detects on-hook, off-hook, and DTMF tones. The telephony card 363 provides ringback and busy tones to the telephones 101 and 102. The telephony card 363 interworks analog telephony signals with ATM signals. In some embodiments, the telephony card 363 provides echo cancellation or other digital signal processing functions. The telephony card 363 could be adapted from the telephony card product supplied by Innomedia Logic of Quebec, Canada.

The other cards 364 represent a number of different cards that can be plugged into the residential hub. Empty slots for additional cards are also shown on the ATM backplane. Some examples of other cards 364 include a Java card, ATM card, MPEG card, utility card, or LAN card. The cards provide communications services to the end users as discussed below.

The Java card includes a processor and memory and is operational to receive Java applets from the service node. Java applets can support a wide variety of tasks. In particular, Java applets can be used to provide the intelligence to support class 5 features, such as call waiting and call forwarding. The Java card also exerts control over the cards and DSL/ATM interface 361. This could include ATM virtual connection assignments for communications to the mux or a service node. The Java card may also communicate with the service node to request numerous other communications services. The ATM card provides an ATM interface to devices within the residence. If the ATM card exchanges ATM signaling with resident devices over VPI=0 and VPI=5, then the ATM card may use virtual path associated signaling to exchange control information with the service node. The MPEG card provides an MPEG interface to devices within the residence. MPEG is a video formatting standard. Typically, the MPEG card will receive MPEG formatted video in ATM cells through the ATM/DSL interface 361 and provide video signals to devices in the residence. The utility card is coupled to utility metering devices in the home. The utility card is programmed to collect the metering information and forward it to the utility companies through ATM/DSL interface 361. The LAN card supports a LAN that is internal to the residence. For, example, the LAN card could support ethernet connections to multiple computers. The computers could access the Internet through the LAN card and ATM/DSL interface 361.

Figure 4:
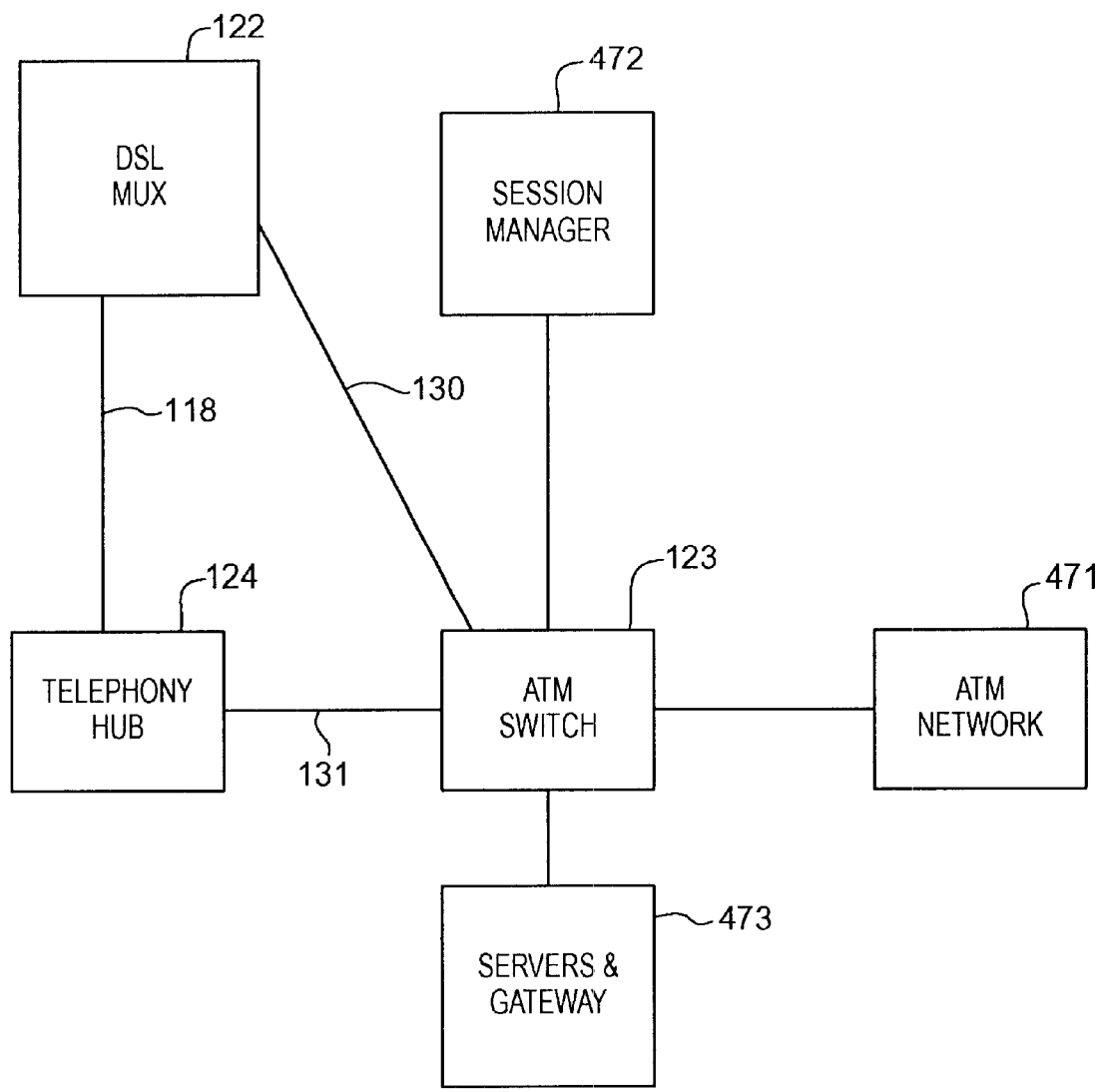
FIG. 4 is a block diagram of a n ATM switch in an embodiment of the invention.

The ATM Switch and Session Manager—FIG. 4

FIG. 4 depicts the ATM switch 123 connected to the DSL mux 122 over connection 130 and to the telephony hub 124 over the connection 131. The DSL mux 122 is connected to the telephony hub 124 over the connection the 118. FIG. 4 also shows an ATM network 471, a session manager 472, and servers and gateways 473. The ATM network 471 is comprised of ATM core switches such as the model 20 supplied by NEC.

The session manager 472 is a communications control processor that initiates services for the end users. Version 0.8 of the "Retailer Reference Point Specification" issued by the Telecommunication Information Network Architecture Consortium (TINA-C) specifies the session manager 472. Session manager 406 houses a user agent that interacts with provider agents in the residential hub 121 and the telephony hub 124. Together, the user agent and the provider agent communicate to establish requirements for a communications service. One requirement is quality of service and it typically entails bandwidth, priority, as well as other factors. The session manager 472 issues control messages to the ATM switch 123 provide the communications paths for the communications service.

The combination of the provider agent and session manager provides numerous incoming call management capabilities. Based on these capabilities, the users can establish their own preferences and policies. If a single phone number is assigned to all the phones, then one policy for handling incoming calls would be to ring all the idle phones. When one of the phones is answered, the call is routed to that phone and the ringing is stopped at the other phones. With a residential hub, a policy would be that a particular idle phone is selected for ringing. The selection could also be based on any number of inputs such as the caller identity, time of day, day of week, etc. In general, a very flexible association between phone numbers and assigned telephone lines can be created with a residential hub. There can be one phone number per line, or there can be more phone numbers than lines with distinctive ringing based on the called number.

The servers and gateways 473 represent a number of devices that are used in conjunction with the ATM switch 123, such as a feature server, a Public Switched Telephone Network (PSTN) gateway, and a service manager server. The feature server provides various features to the end users. The feature server may provide class 5 features to end users. The feature server may download software or Java applets to the residential hub. The feature server could provide other features, such as intranets, voice mail, or personalized internet web pages and browsers. The service manager server provides network management capability for service assurance and service delivery. The service manager server manages and monitors the network elements. The service manager server has user interfaces for web-browsers, Java, and ethernet; and network interfaces for ethernet, Simple Network Management protocol (SNMP), Common Management Information Protocol (CMIP), and Transaction Language One (TL-1). Servers and gateways 473 could also include security servers, routers, Internet Protocol forwarders, intranet servers, and protocol servers.

The PSTN gateway is connected to the local networks and long distance networks that comprise the PSTN by connections such as TR-317 connections, TR-394 connections, and Signaling System #7 (SS7) signaling links. The PSTN gateway interworks the TDM traffic from the PSTN with the ATM traffic from ATM switch 123. The PSTN gateway also interworks SS7 signaling and ISDN signaling from the PSTN with ATM signaling from the session manager 472. The PSTN gateway supports intelligent network functions such as "800", line information data bases local number portability, emergency 911, and operator services. The PSTN gateways uses AAL1 based DS0 circuit emulation with echo cancellation for ATM traffic.

If the user has a personal computer with an HTML browser, the user can access a network service that can allow the user to create a personalized set of call management rules that control communications with the user. This would be achieved via a graphical application where the user creates a decision free by putting components together on a palette. This information would be distributed between the session manager 472 and the provider agent. For example, the session manager 472 would know which calls to route to voice mail based on the caller's identity. For such a call, the provider agent will not need to get a call message from session manager 472. On the other hand, the logic discussed above that handles which phone(s) to alert will be encapsulated in the provider agent.

System Operation—FIGS. 1–4

An example will be discussed to illustrate the operation of the ATM communication system 100. One skilled in the art will appreciate that numerous other examples could also be supported by the invention. In the example, the telephone 103 is used to call the telephone 102. A caller takes the telephone 114 off-hook. The telephony hub 124 senses the off-hook and provides dial tone to telephone 103. The caller inputs the called number digits and the telephony hub 124 detects the digits. When the digits are collected, the telephony hub 124 requests a communications path for the call from the session manager 472. The session manager 472 processes the called number and identifies the residential hub 121 as the network termination point. The session manager 472 sends a message to the ATM switch 123 to establish an SVC from telephony hub 124 to residential hub 121 through the DSL mux 122 and connections 113, 130, and 131.

The session manager 472 instructs residential hub 121 to alert the telephone 102, and the residential hub 121 rings the telephone 102. The residential hub 121 sends a reply through the session manager 471 to the telephony hub 124 indicating that telephone 102 is ringing. The telephony hub 124 plays a ringback tone to the telephone 103 to emulate the ringing telephone 102. If the telephone 102 had been busy, the reply would have indicated a busy status and telephony hub 124 would have played a busy tone to telephone 103.

If telephone 102 is answered, the residential hub 121 detects the off-hook condition and sends a message through the session manager 472 to the telephony hub 124 that the called party has joined the call. The session manager 472 directs the residential hub 121 to interwork the ATM connection 113 with the analog telephony connection 112 to the telephone 102. The session manager 472 directs the telephony hub 124 to interwork the ATM connection 131 with the analog telephony connection 114 to the telephone 103. At this point, the call connection is established. When either telephone 102 or 103 hangs up, the respective hub 121 or 124 will detect the on-hook condition and send a termination message through the session manager 472 to the other hub. As a result, the call connections are released.

An important feature of the residential hub and telephony hub is the support of POTS service by providing a proxy. The telephones operate in their normal manner, and the hubs provide an "interpreter" between the telephones and the session manager. This "interpreter" function is a proxy. A proxy could also be provided for legacy Internet communications. When a computer at a residence attempted an Internet communication, the proxy would intercept the IP packet. The proxy could either translate the IP address into a destination and provide the destination to the session manager, or simply forward the IP address the session manager. Either way, the session manager would set up an ATM SVC to the destination. The legacy application on the computer could communicate using IP addressing, but would be supplied with ATM connections using the proxy.

The Provider Agent FIGS. 5–10

Figure 5:
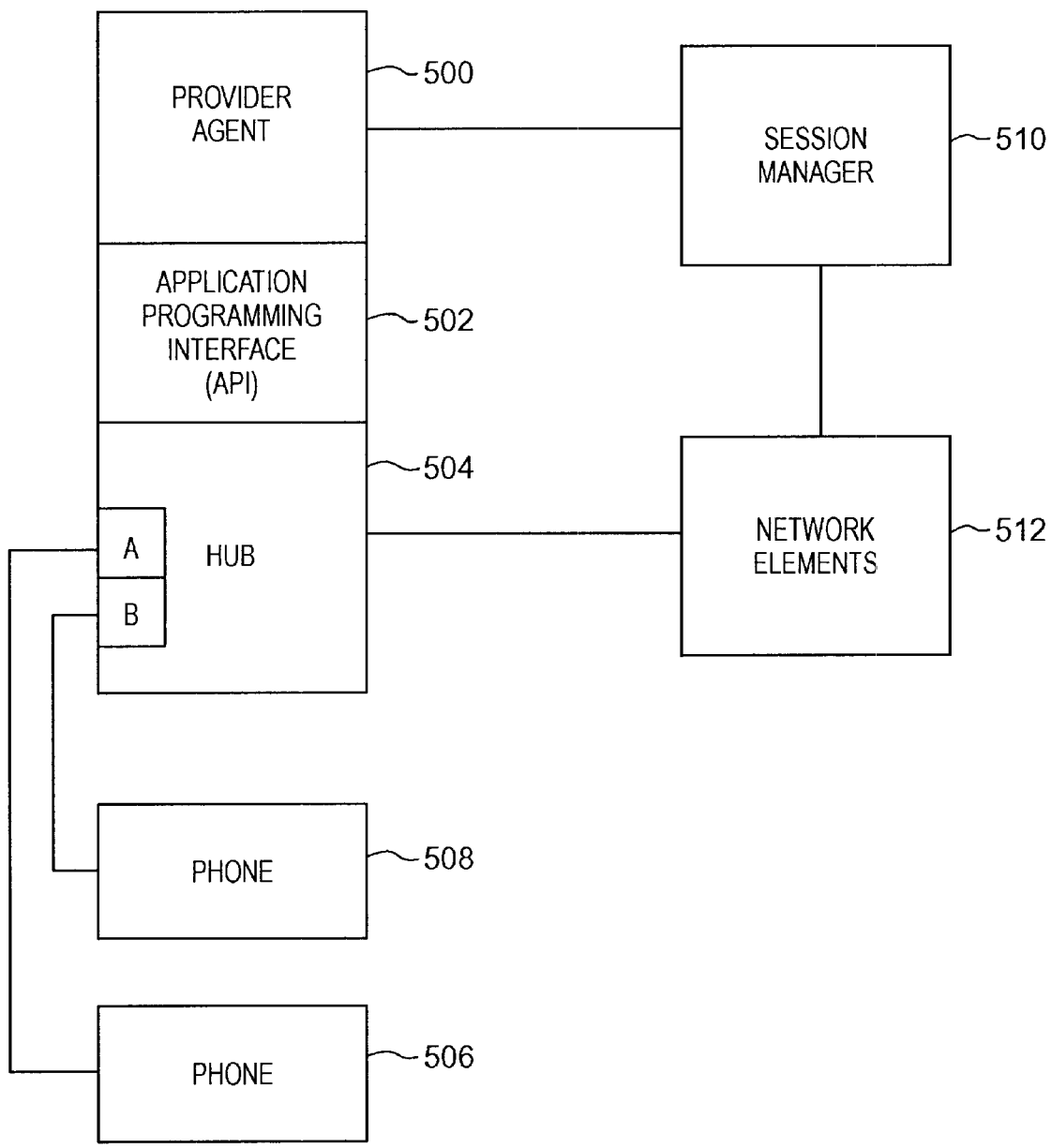
FIG. 5 is a block diagram of a system architecture including a provider agent in an embodiment of the invention.

FIG. 5 depicts a block diagram of one example of a system architecture including a provider agent 500. The provider agent 500 is coupled to an Application Programming Interface (API) 502. The API 502 is coupled to a hub 504. The hub 504 is connected to phones 506 and 508 over channels A and B respectively. The provider agent 500 is coupled with a session manager 510. The hub 504 is connected to network elements 512.

Network elements 512 provide digital communications services to the hub 504. Some examples of network elements 512 are ATM switches and DSL muxes, DSL equipment, Internet Protocol (IP) routers and servers, and enhanced services platforms. The session manager 510 controls the set-up and delivery of communications services. The session manager 510 receives user service requests and invokes the desired services through network elements 512. The hub 504 represents a residential hub or a telephony hub.

Version 0.8 of the "Retailer Reference Point Specification" issued by the Telecommunication Information Network Architecture Consortium (TINA-C) specifies the connection and messaging between the session manager 510 and the provider agent 500. The interface between the session manager 510 and the provider agent 500 is compiled into the Common Object Request Broker Architecture (CORBA) Interface Definition Language (IDL). The interface transport is via Transaction Control Protocol/internet Protocol (TCP/IP) using Logic Link Control/Sub-Network Access Protocol (LLC/SNAP) encapsulation and ATM Adaptation Layer 5 (AAL5) to provide Permanent Virtual Connection (PVC) connectivity.

The phones 506 and 508 represent any communications devices supported by the hub 504. Some examples are conventional analog telephones, wireless phones, computers, modems, and fax machines. Additional phones could be connected to channels A and B, or additional phones could be connected to additional channels on the hub 504. Only two channels with one phone each is shown for the sake of clarity.

The API 502 is a software interface that exchanges event messages and instructions between the hub 504 and the provider agent 500. The provider agent 500 accepts event messages from the hub 504 through the API 502 and provides instructions back to the hub 504. For example, the provider agent 500 might receive information through the API 502 that the phone 506 has gone off-hook. In response, the provider agent 500 might provide a control instruction through the API 502 to the hub 504 to provide dial tone to the phone 506. In some embodiments of the invention, the API 502 is specified in CORBA IDL.

The provider agent 500 responds to event messages for the phones 506 and 508 with instructions for the hub 504 to interact with the user. User interaction includes dial tone, digit collection, ring, ringback, and busy signals. The provider agent 500 also exchanges messaging with the session manager 510. Messages include invite messages, reply messages, join messages, confirm messages, and terminate messages.

Both the provider agent 500 and the API 502 are comprised of software that is stored on a software storage medium. Examples of a software storage medium include magnetic disks, optical disks, or integrated circuits. The provider agent 500 and the API 502 could also be stored on a server and down-loaded to a user over the Internet or another operational connection. Both the provider agent 500 and the API 502 are executed by a microprocessor system. The microprocessor system could be comprised of a single microprocessor or a configuration of related microprocessors. The microprocessor system could be housed in many devices with a few examples being the hub 504, a residential communications hub, a telephony hub, a computer, or a telephony card. In some embodiments of the invention, the provider agent is comprised of objects written in C++ code.

Figure 6:
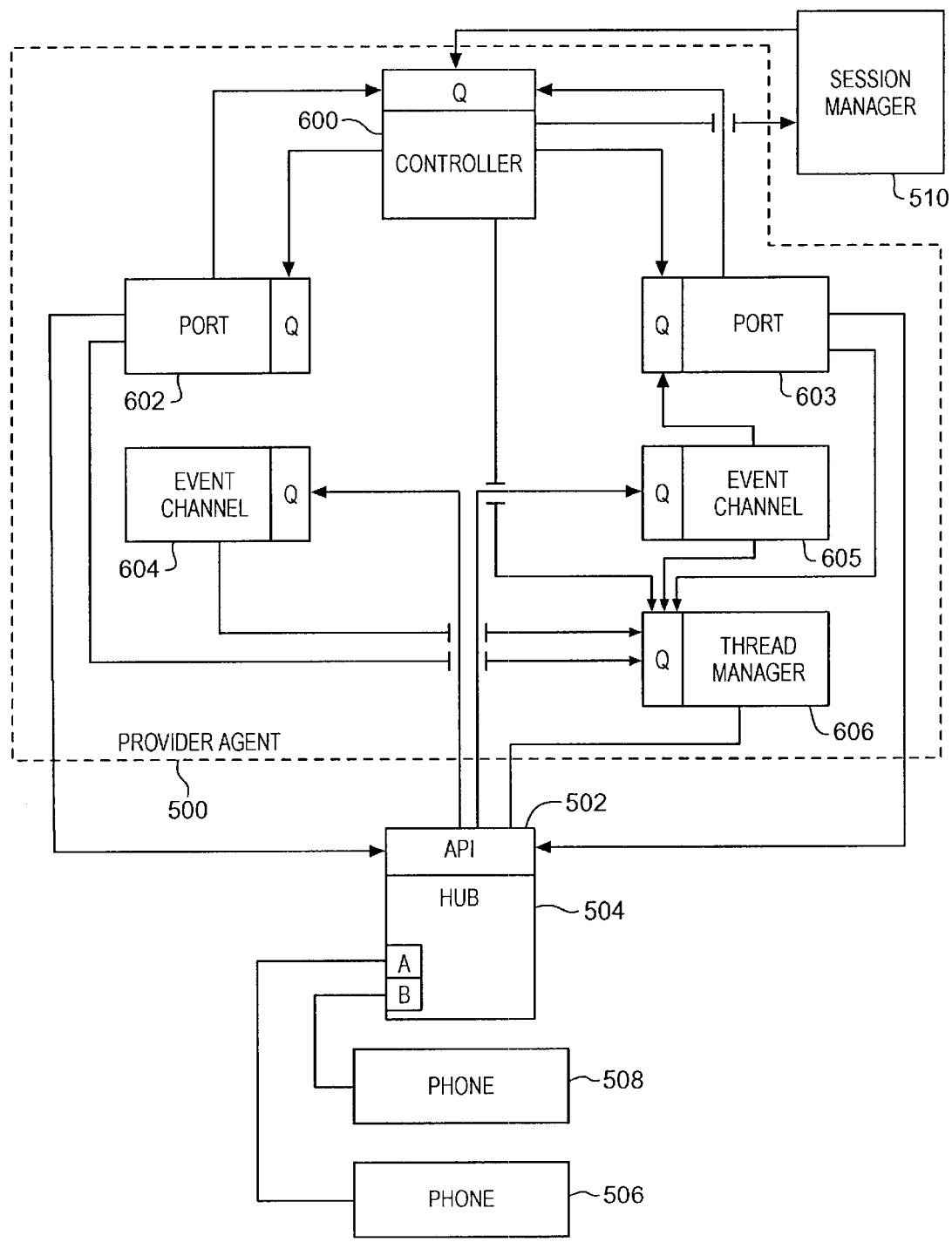
FIG. 6 is a block diagram of a software architecture for a provider agent in an embodiment of the invention.

FIG. 6 depicts one example of a software architecture for the provider agent 500. The provider agent 500, the API 502, the hub 504, the phones 506 and 508, and session manager 510 are shown as in FIG. 5 and operate as discussed above. The provider agent 500 is comprised of the following software objects: a controller object 600, port objects 602–603, event objects 604–605, and a thread manager object 606. The port object 602 and the event object 604 are associated with channel A. The port object 603 and the event object 605 are associated with channel B. These software objects are executed by a multi-threaded processing system with each object having its own thread. Each object also has a queue that is indicated on FIG. 6 by the letter "Q". The queue is the software component that receives and buffers messages for the object.

The controller object 600 communicates with the session manager 510 and the port objects 602–603. Communications with the session manager 510 are comprised of the following messages:

Start Service—a message to the session manager that initially identifies the service requested and includes an access key, a service ID, and user information.

Reference Information—a message from the session manager that includes session ID, party ID, and a secret ID.

Invite—a message that requests a telephony session and includes the dialed number(s).

Reply—a message that responds to an Invite message and indicates alerting, busy, or reject.

Join—a message that indicates that the party is ready to join the session.

Add Stream—a message to the session manager that requests a connection to be established to another party and that includes the terminal ID, the Party ID and the Virtual Path (VP)/Virtual Connection (VC).

Join Stream—a message from the session manager that requests a party to attach to a connection from another party.

Confirm—a message that is sent or received by the provider agent and that indicates that an ATM network connection has been made.

Terminate—a message that is sent or received by the provider agent and that indicates that the session is over.

The controller object 600 encapsulates call related information by generating call record objects that are identified by session ID and channel ID. The controller object 600 stores data indicating the idle or busy status of each channel. The controller object 600 includes an internal data structure for any desired call-handling policies. Call handling policies include rules for call waiting, voice mail, call blocking, and the internal routing of incoming calls to particular phones, such as idle phones. These policies can be varied based on the caller's number, the time of day, or other factors. In an analog hub scenario, the controller object 600 encapsulates data to associate calls with particular channels by the called number, and the association can be modified by the user or by the network.

Figure 7:
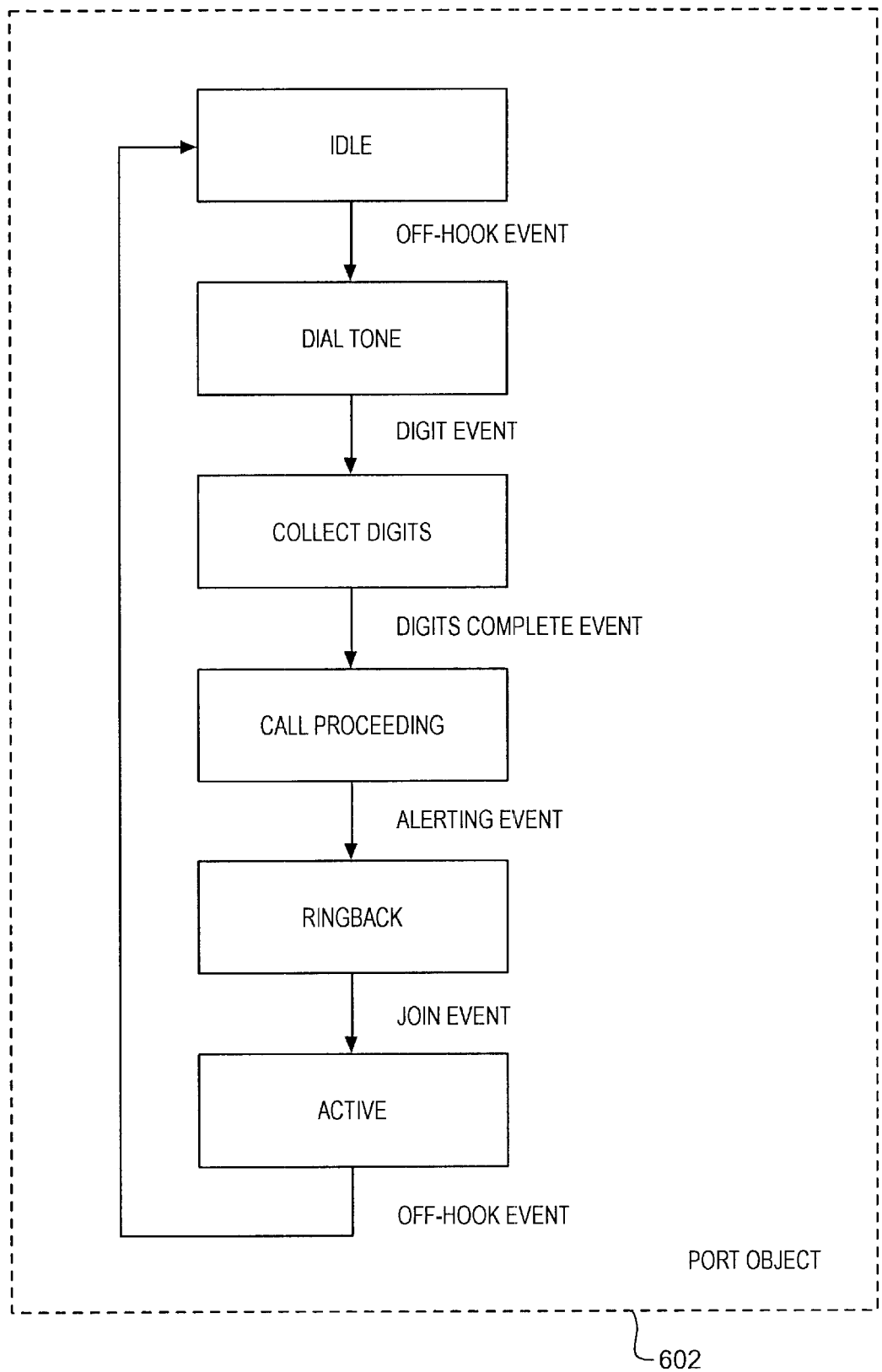
FIG. 7 is a block diagram of a port object state machine in an embodiment of the invention.

The port objects 602–603 are state machines. FIG. 7 depicts one example of a state machine for the port object 602 in block diagram form. The initial state is Idle. An off-hook event for channel A moves the port object 602 to the dial tone state and an instruction to provide dial tone is provided to the hub 504. A digits event for channel A moves the port object 602 to the collect digits state and an instruction to stop dial tone is provided to the hub 504. The port object 602 creates a digit collection object. Digits that are collected by the hub 504 are provided to the digit collection object for analysis. The digit collection object determines the type of number dialed, such as emergency numbers, seven-digit numbers, ten-digit numbers, and international numbers. The digit collection object instructs the port object 602 when digit collection is complete. A digits complete event for channel A moves the port object 602 to the call proceeding state and the port object 602 instructs the controller object 600 to send Start Service and Invite messages to the session manager 510. An alerting indication from the controller object 600 moves the port object 602 to the ringback state where a ringback instruction is provided to the hub 504. The alerting event is based on a reply message from the session manager 510. A join event from the controller object 600 moves the port object 602 to the active state where the session is conducted. The join event is based on a join message from the session manager 510. An on-hook event for channel A moves the port object 602 back to the idle state and results in a termination message being sent by the controller object 600 to the session manager 510.

A few deviations from the above-described state machine should be appreciated. If the reply message had a busy indication, a busy state would be entered instead of the ringback state, and a busy tone instruction would be provided to the hub 504. If the reply message had a reject indication, a fast-busy state would be entered instead of the ringback state and a fast-busy tone instruction would be provided to the hub 504. In both of the above cases, an on-hook event moves the port object 602 back to the idle state.

When receiving a call, the state machine is much simpler. In the idle state, an invite indication from the controller object 600 moves the port object 602 to the ring state where the hub 504 is instructed to ring channel A. The invite indication is based on an invite message from the session manager 510. An off-hook event for channel A moves the port object 602 to that active state, until an on-hook event moves the port object 602 back to the idle state.

Referring back to FIG. 6, the event objects 604–605 track the events for each respective channel and indicate the events to the respective port objects 602–603. The event object 604 can process events using a different thread than the port object 602, and the event object 605 can process events using a different thread than the port object 603. Multi-threaded processing in this manner has advantages. The event objects 604–605 can verify proper message format and content before indications are provided to the state machines in port objects 602–603.

The API 502 utilizes a messaging format comprised of an instruction followed by variables in parentheses. The primary instructions are:

start ring (channel ID)

stop ring (channel ID)

start tone (channel ID, tone type)

stop tone (channel ID, tone type)

wait event (channel ID, event type)

event (channel ID, event type, value)

open voice channel (channel ID, VPI/VCI)

close voice channel (channel ID, VPI/VCI)

In the above messages, the channel ID identifies the relevant channel of the hub 504. The tone types are dial tone, ringback, busy, and fast-busy. The event types are off-hook, on-hook, and digit. The value is the value of the digit. The VPI/VCI identifies the Virtual Path and Virtual Channel used by the hub 504 for the session.

The thread manager object 606 provides fault tolerance for software failures and certain hardware failures. The thread manager object 606 continuously receives heartbeat messages from the objects. If a heartbeat message is not received as expected, the thread manager object 606 identifies and attempts to restart the affected thread. If the heartbeat is still absent, the thread manager object 605 instructs the hub 504 to use conventional fail-over analog telephone service for the channel with the malfunctioning thread.

Figure 8:
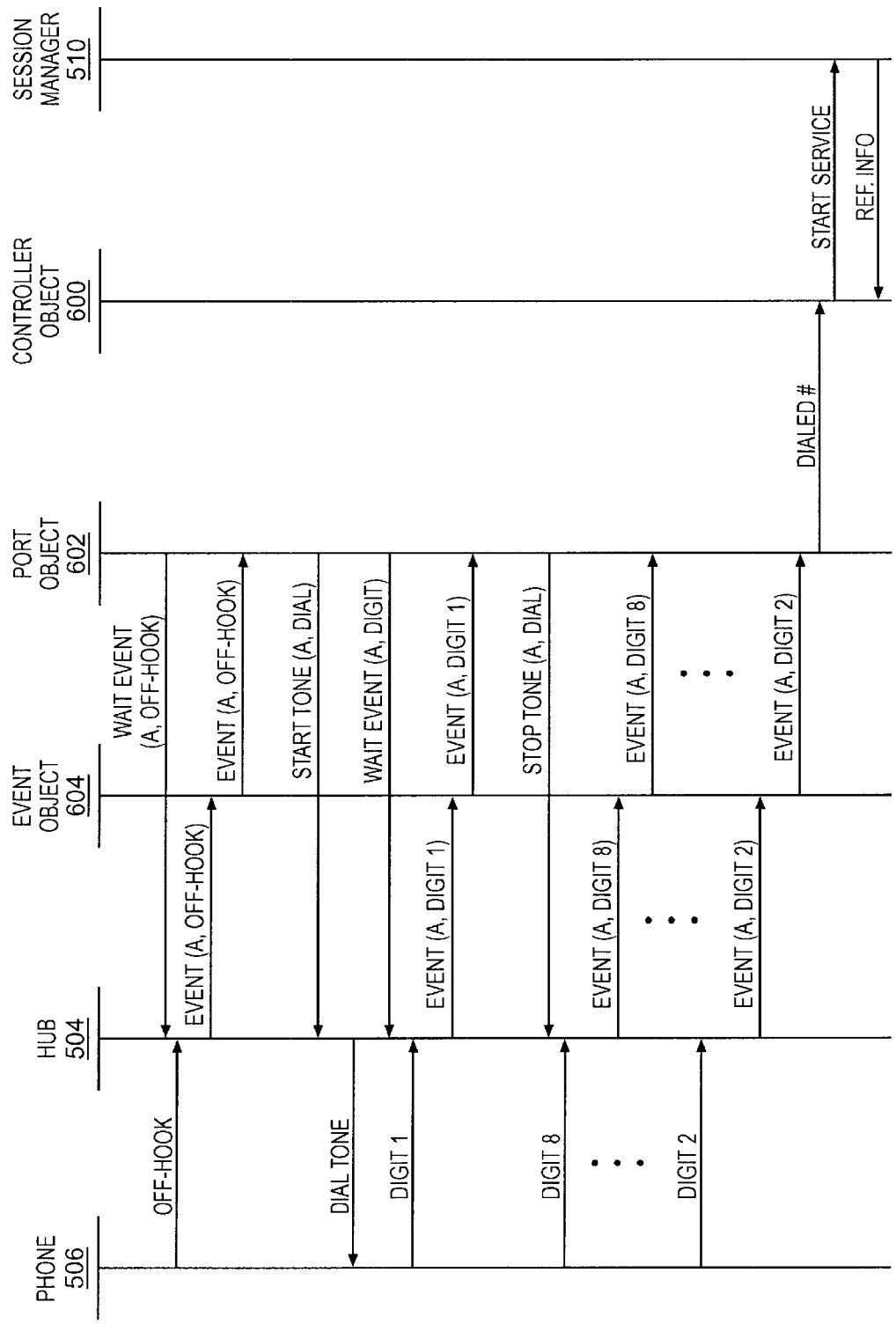
FIGS. 8–10 are message sequence charts depicting operation of a provider agent in an embodiment of the invention.
Figure 9:
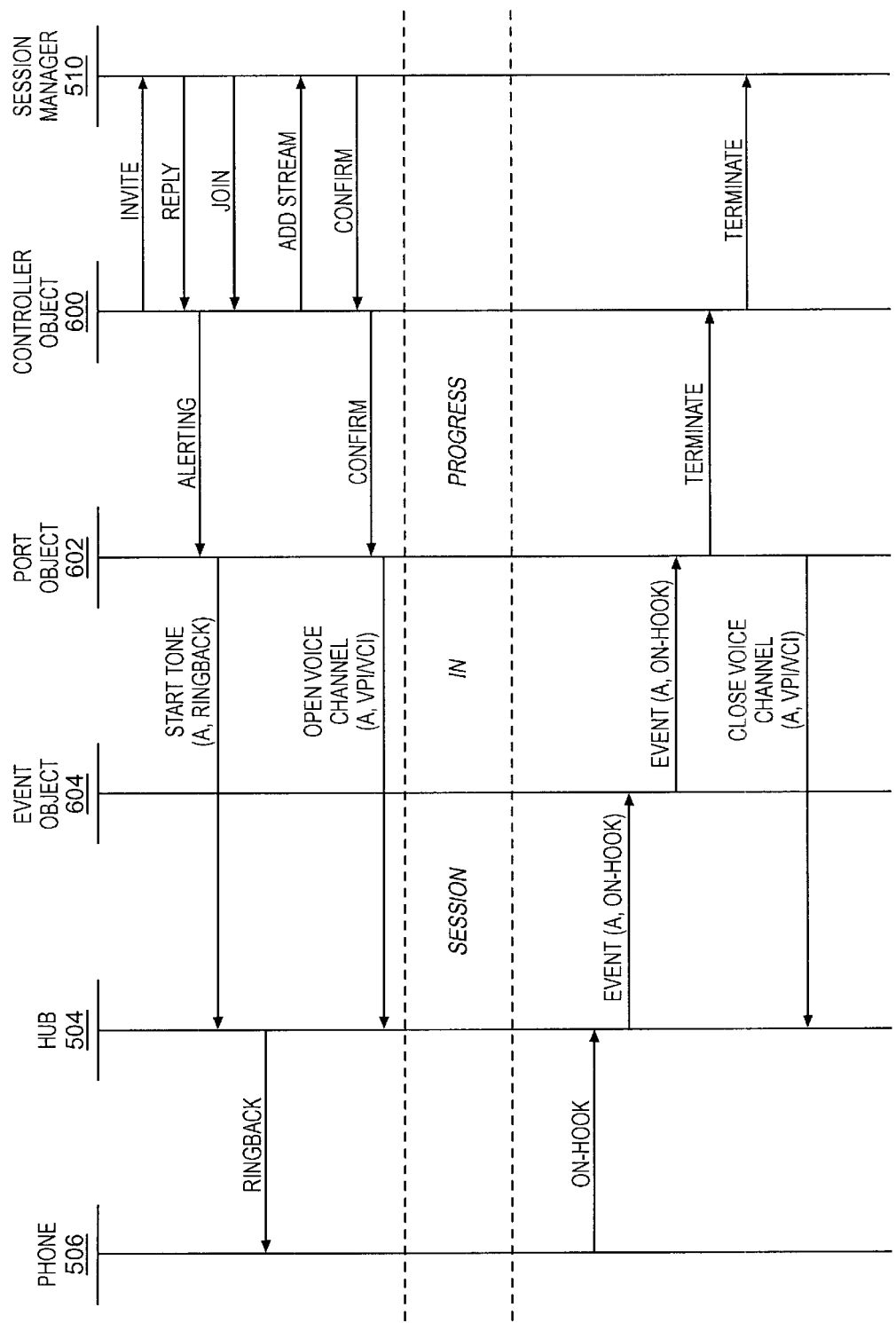
Figure 10:
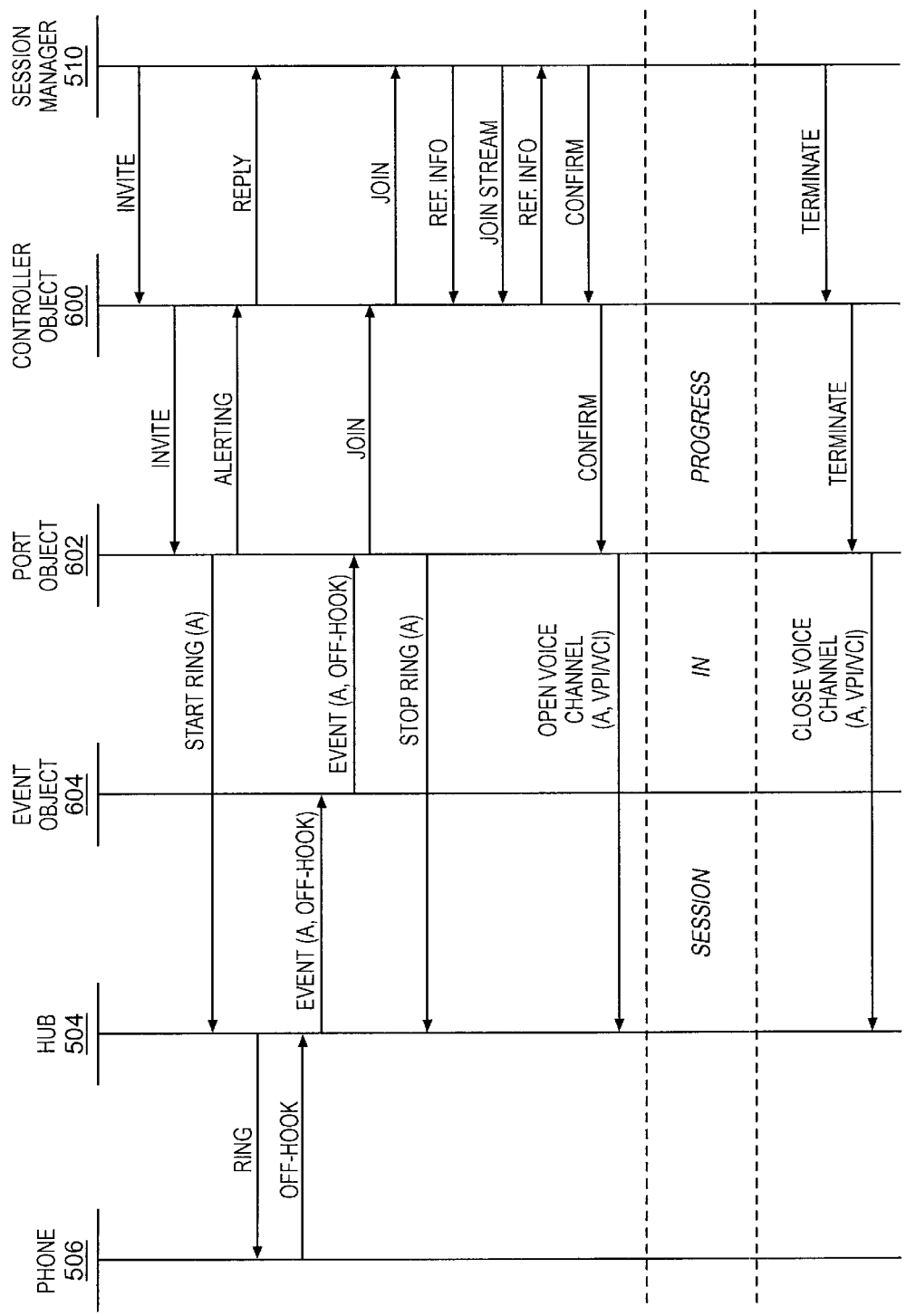

FIGS. 8–10 depict a message sequence chart for operative examples of the invention, but the invention is not restricted to these examples. In the first example starting on FIG. 8, the port object 602 sends "wait event (A, off-hook)" to the hub 504. When the user places a call by taking the phone 506 off-hook, the hub 504 detects the off-hook event and transmits "event (A, off-hook)" to the event object 604. Messages between the hub 504 and the event object 604 or the port object 602 utilize the API 502. The event object 604 provides an off-hook indication to the port object 602. The port object 602 moves from the idle state to the dial tone state and responds to the hub 504 with the messages "start tone (A, dial)" and "wait event (A, digit)". The port object 602 also generates an instance of a digit collection object to process subsequently collected digits.

The user inputs a called number using the telephone 506. The hub 504 detects the digits and forwards the values to the event object 604. For a called number of 1-800-555-2222, the messages "event (A, digit, 1)" and "event (A, digit, 8)" would be used for the first two dialed digits, and the message "event (A, digit, 2)" would be used for the last dialed digit.

After the first digit, the port object 602 moves from the dial tone state to the digits state and sends "stop tone (A, dial)" to the hub 504. In response, the hub 504 stops the dial tone on channel A. The port object 602 also processes the digit values with the digit collection object.

The digit collection object determines that the formatting of the called number is correct and that digit collection is complete. The digit collection object indicates to the port object 602 that digit collection is complete and provides the called number. In response to the digits complete message, the port object 602 moves from the digits state to the call proceeding state and indicates a request for telephony service with the dialed number to the controller object 600.

The controller object 600 generates and transmits a Start Service message requesting telephone service to the session manager 510. The session manager 510 responds with reference information such as the session ID, the party ID, and a secret ID. On FIG. 9, the controller object 600 generates and transmits an invite message with the dialed number to the session manager 510. The session manager 510 typically sets-up the session and returns a reply message to the controller object 600 indicating that the called party is being alerted. Alternatively, the called party might be busy or might reject the session.

If an alerting indication is received in the reply message, the controller object 600 indicates the alerting condition to the port object 602, and the port object moves to the ringback state. The port object 602 sends "start tone (A, ringback) to the hub 504. In response, the hub 504 puts a ringback tone on channel A to emulate a ringing phone at the far end.

When the party at the far end accepts the invitation, the session manager 510 sends a Join message to the controller object 600. In response, the controller object 600 generates and transmits an add stream message to the session manager 510 with the terminal ID, the party ID, and the VPI/VCI. The session manager 510 sends a Confirm message to the controller object 600, and the controller object 600 sends a confirm indication to the port object 602. In response to the confirm indication, the port object 602 sends "open voice channel (A,VPI/VCI)" to the hub 504. In response to the open voice channel message, the hub 504 stops the ringback tone and interworks the analog telephony signal on channel A with the ATM signal on the VPI/VCI. At this point, the session is in progress and the telephone call can proceed.

The session ends when the user places the phone 506 on-hook. The hub 504 sends "event (A, on-hook)" to the event object 604 which indicates the on-hook to the port object 602. The port object 602 indicates the termination status to the controller object 600 and sends "close voice channel (A, VPI/VCI)" to the hub 504. The hub 504 ceases to interwork channel A with the VPI/VCI. The controller object 600 generates and transmits a Terminate message to the session manager 510.

FIG. 10 depicts a call to the phone 506 that is terminated by the other party. The controller object 600 first receives an Invite message with a session ID and dialed number from the session manager 510. In an analog hub scenario, the controller associates the called number in the message with the appropriate channel. The controller object 600, based on its call-handling policy, determines which phone to route the call to. In this example, the call is routed to channel A. The controller object 600 indicates the invitation to the port object 602, and the port object 602 sends "start ring (A)" to the hub 504. The hub 504 begins to ring the phone 506. The controller object 600 sends a reply message back to the session manager 510 indicating that the user is being alerted.

In the alternative, the reply message sent to the session manager 510 could indicate that the phone 506 was busy or that the session was rejected.

When the user takes the phone 506 off-hook to answer the call, the hub 504 sends "event (A, off-hook)" to the event object 604 which indicates the off-hook to the port object 602. The port object 602 sends "stop ring (A)" the hub 504 which stops the ringing. The port object 602 informs the controller object 600 that the user has joined the session and the controller object 600 sends a join message to the session manager 510.

The session manager 510 sends reference information to the controller object 600 indicating the session ID, party ID, and secret ID. The session manager 510 also sends a Join Stream message to the controller object 600. In response, the controller object 600 generates and transmits reference information to the session manager 510 with the terminal ID, the party ID, and the VPI/VCI. The session manager 510 sends a Confirm message to the controller object 600 and the controller object 600 sends a confirm indication to the port object 602. In response to the confirm indication, the port object 602 sends "open voice channel (A,VPI/VCI)" to the hub 504. At this point, the session manager 510 has the information to set-up the connection. Subsequently, the session is in progress and the telephone call can proceed.

The session ends when a termination message is received by the controller object 600 from the session manager 510. The controller object 600 indicates the termination status to the port object 602 which sends "close voice channel (A, VPI/VCI)" to the hub 504. The hub 504 ceases to interwork channel A with the VPI/VCI.

It should be appreciated that various combinations of call origination and termination can occur in the context of the invention. For example the phone 506 can originate a call or receive a call. Likewise, the phone 506 can terminate a call or the called party can terminate a call. It should also be appreciated that the port object 603 and the event object 605 operate in a similar fashion to the port object 602 and the event object 604 respectively. Using these objects, the provider agent can handle multiple sessions at the same time. A provider agent can have numerous such objects, but only two groups are shown for purposes of clarity.

Race conditions exist when improper events occur given the current state of the port objects 602–603. This typically occurs when calls are incoming and outgoing at the same moment. One example is where an invite message is received by the controller object 600, and the controller object 600 determines that the status of channel A is idle, but in reality, the port object 602 is already in the dial tone state due to an off-hook event. The port object 602 will receive an invite indication from the controller object 600 when it expects to receive digit indications from the event object 604. In this case, the port object 602 must instruct the controller object 600 to reply busy or reject, and to set channel A status to busy.

In another example, the controller object 600 may receive an invite message from the session manger 161, but before the phone 506 rings, the phone 506 goes off-hook. The port object 602 will receive an invite indication from the controller object 600 and an off-hook event from the hub 504. In this case, the port object 602 instructs the hub 504 to open the voice channel and VPI/VCI for the incoming call as if the phone was answered for that call.

The invention is not restricted to basic telephone service. A subscription/configuration service could also be deployed. The provider agent would analyze the called number to determine if telephone service or the subscription/ configuration service is requested. The provider agent would then direct the telephony card to couple the call to the requested service. Other services could be implemented in a similar fashion.

Those skilled in the art can appreciate variations of the above-described embodiments that fall within the scope of the invention. As a result, the invention is not limited to the specific embodiments discussed above, but only by the following claims and their equivalents.

What is claimed is:

1. An Asynchronous Transfer Mode (ATM) communications system for providing telephony service, wherein the ATM communications system comprises;
    a residential communications hub located at a residence and operational to communicate using an analog telephony format with a plurality of first telephones located in the residce, operational to convert between the analog telephony format and an ATM format, and operational to communicate using an ATM/DSL format;
    a DSL mux operational to communicate using an ATM/DSL format, operational to convert between the ATM/DSL format and an ATM/broadband format, and operational to communicate using the ATM/broadband format;
    a telephony hub operational to communicate using the analog telephony format with a plurality of second telephones, operational to convert between the analog telephony format and the ATM/broadband format, and operational to communicate using the ATM/broadband format;
    an ATM switch operational to communicate using the ATM/broadband format and operational to establish ATM communications paths for the telephone service;
    first telephone wiring operational to carry the ATM/DSL format and connecting the residential communications hub to the DSL mux;
    second telephone wiring operational to carry the analog telephony format and connecting the second telephones to the telephony hub;
    a first broadband connection operational to carry the ATM/broadband format and connecting the DSL mux to the ATM switch; and
    a second broadband connection operational to carry the ATM/broadband format and connecting the telephony hub to the ATM switch.

2. The ATM communications system of claim 1 further comprising:
    a digital loop carrier operational to communicate using the analog telephony format with a plurality of third telephones, operational to convert between the analog telephony format and a Time Division Multiplex (TDM) format; operational to communicate using the TDM format;
    third telephone wiring operational carry the analog telephony format and connecting the third telephones to the digital loop carrier;
    a TDM connection operational to carry the TDM format and connecting the digital loop carrier to the telephony hub; and
    wherein the telephony hub is operational to communicate using the TDM format and operational to convert between the TDM format and the ATM/broadband format.

3. The ATM communications system of claim 1 further comprising:
    a digital loop carrier operational to communicate using the analog telephony format with a plurality of third telephones, operational to convert between the analog telephony format and a Time Division Multiplex (TDM) format; operational to communicate using the TDM format;
    a class 5 telephone switch;
    third telephone wiring operational carry the analog telephony format and connecting a plurality of third telephones to the digital loop carrier;
    a first TDM connection operational to carry the TDM format and connecting the digital loop carrier to the class 5 telephone switch;
    a second TDM connection operational to carry the TDM format and connecting the class 5 telephone switch to the telephony hub; and
    wherein the telephony hub is operational to communicate using the TDM format and operational to convert between the TDM format and the ATM/broadband format.

4. The ATM communications system of claim 3 wherein the telephony hub is operational to route telephone calls to the class 5 telephone switch.

5. The ATM communications system of claim 1 further comprising:
    a digital loop carrier operational to communicate using the analog telephony format with a plurality of third telephones, operational to convert between the analog telephony format and a Time Division Multiplex (TDM) format; operational to communicate using the TDM format;
    a DS0 cross-connect;
    third telephone wiring operational carry the analog telephony format and connecting a plurality of third telephones to the digital loop carrier;
    a first TDM connection operational to carry the TDM format and connecting the digital loop carrier to the DS0 cross-connect;
    a second TDM connection operational to carry the TDM format and connecting the DS0 cross-connect switch to the telephony hub; and
    wherein the telephony hub is operational to communicate using the TDM format and operational to convert between the TDM format and the ATM/broadband format.

6. The communications system of claim 1 wherein the ATM/broadband format is an ATM/Synchronous Optical Network (SONET) format.

7. The communications system of claim 1 further comprising:
    third telephone wiring operational carry the analog telephony format and connecting the DSL mux to the telephony hub; and wherein
    the residential hub is operational to connect the first telephones to the first telephone wiring;
    the DSL mux is operational to connect the first telephone wiring to the third telephone wiring; and the telephony hub is operational provide the analog telephone service to the first telephones over the first and third telephone wiring.

8. The communications system of claim 7 wherein:

the residential hub is operational to automatically connect the first telephones to the first telephone wiring when the residential hub is unable to provide analog telephone service to the first telephones;

the DSL mux is operational to automatically connect the first telephone wiring to the third telephone wiring when the residential hub is unable to provide the analog telephone service to the first telephones; and the telephony hub is operational automatically provide the analog telephone service to the first telephones over the first and third telephone wiring.

9. The communications system of claim 1 wherein the telephony hub is operational to convert facsimile calls into a variable bit rate ATM signal.

10. The communications system of claim 1 wherein the telephony hub is operational to convert modem calls into a variable bit rate ATM signal.

* * * * *